Nov. 1, 1938.                C. GEISSEN                2,135,394
                      POWER PLANT SUSPENSION MEANS
                   Filed Sept. 3, 1935        3 Sheets-Sheet 1
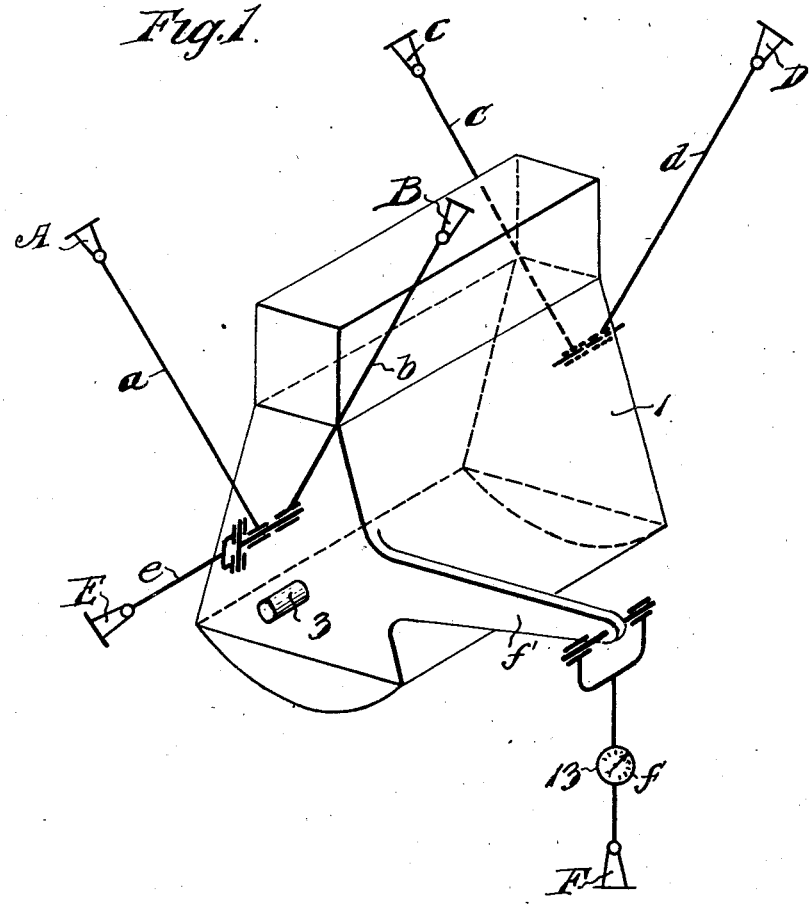
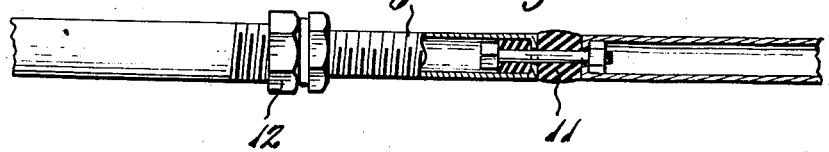
Inventor
C. Geissen
By Robt V Robb
Attorney Nov. 1, 1938.    C. GEISSEN    2,135,394
POWER PLANT SUSPENSION MEANS
Filed Sept. 3, 1935    3 Sheets-Sheet 2

Inventor
C. Geissen
By Robb & Robb
Attorneys

Nov. 1, 1938.  C. GEISSEN  2,135,394
POWER PLANT SUSPENSION MEANS
Filed Sept. 3, 1935  3 Sheets-Sheet 3

Inventor
C. Geissen
By Robb & Robb
Attorneys

Patented Nov. 1, 1938

2,135,394

UNITED STATES PATENT OFFICE

2,135,394

POWER PLANT SUSPENSION MEANS

Carl Geissen, Berlin-Schoneberg, Germany, assignor of one-half to Rheinmetall-Borsig Aktiengesellschaft Application September 3, 1935, Serial No. 39,031
In Germany September 5, 1934

9 Claims. (Cl. 248—8)

The mounting of power engines upon vehicles, especially railroad cars, ships, or the like, is usually accomplished by forming a part of the chassis of the vehicle into a supporting frame or foundation, to which the engine frame is connected by means of fastening means such as bolts, rivets, or the like. It will be obvious that such a connection between the engine and the chassis of a vehicle is more or less rigid, and great disadvantages result therefrom because the slightest deformation of the chassis will tend to cause a deformation of the frame or housing of the engine. To eliminate these disadvantages it has been proposed to interpose on the fastening means elastic elements to thereby reduce the occurrence of tensions produced by deformation of the chassis. However, it has been found in practice that such arrangements do not give the desired results because each deformation of the chassis will still be transferred to the engine frame in view of the multiplicity of connection points availed of in present day constructions. In other words, the position of the chassis in respect to the engine frame is over-engineered geometrically as well as statically.

It will be known to those skilled in the art that each movement of a free and solid body may be analyzed into displacements in three directions not in the same plane and it may be also analyzed into three torsional displacements around these three directions. A free and solid body has, therefore, what is designated in the art as "six degrees of freedom".

The above principle is utilized in the present invention, which proposes an arrangement whereby the engine is suspended from the chassis at only six points.

The arrangement according to the present invention consists in the engine being connected with the chassis of the vehicle by a plurality of suspension rods connected with the chassis by means of ball joints.

While two of these suspension rods or means support the power engine against motions in planes normal to the crank shaft, two other suspension means prevent lateral torsional movements of the engine. Of the additional suspension means, one serves to eliminate the motion of the power engine in the direction of the crank shaft while the other suspension means resists the tendency of rotation of the engine created by the torque of the crank shaft.

In an arrangement of this nature, which constitutes a rigid mounting of the power engine within the chassis, consideration must be given to the fact that in some vehicle structures the wheel axle is subjected to angle variations, and in such cases it will be necessary to interpose within the drive shaft a longitudinally movable clutch for the purpose of compensating for variations in length of the drive shaft, which are a direct result of the angle variations of the wheel axle above referred to.

Especially in vehicle structures where the wheel axle is steerable, attention must be given to this fact and provisions made to compensate for length variations of the drive shaft in the manner referred to above. In such case it is also advisable to eliminate one of the suspension means which facilitates the support of the engine in the direction of the crank shaft, and to replace the same by an intermediate shaft connecting the power engine with the drive shaft of the vehicle. To accomplish the compensation of the angle variations of the wheel axle it is also necessary that the intermediate shaft, the crank shaft, and the driven shaft be interconnected by means of universal joints. In this way the power engine may be suspended within the chassis of a vehicle frame in such a manner as to thereby eliminate entirely the disadvantageous features of present day constructions.

Other and further objects of the present invention will be more fully understood as the description proceeds, and in reference to the accompanying drawings, in which:—

Figure 1 illustrates the suspension of a power engine by means of six suspension means, in a somewhat diagrammatic manner.

Figure 4 is a detail view showing the manner in which elastic elements may be interposed within the suspension means to reduce the transmission of vibrations and noises from the engine to the chassis.

Figure 2:
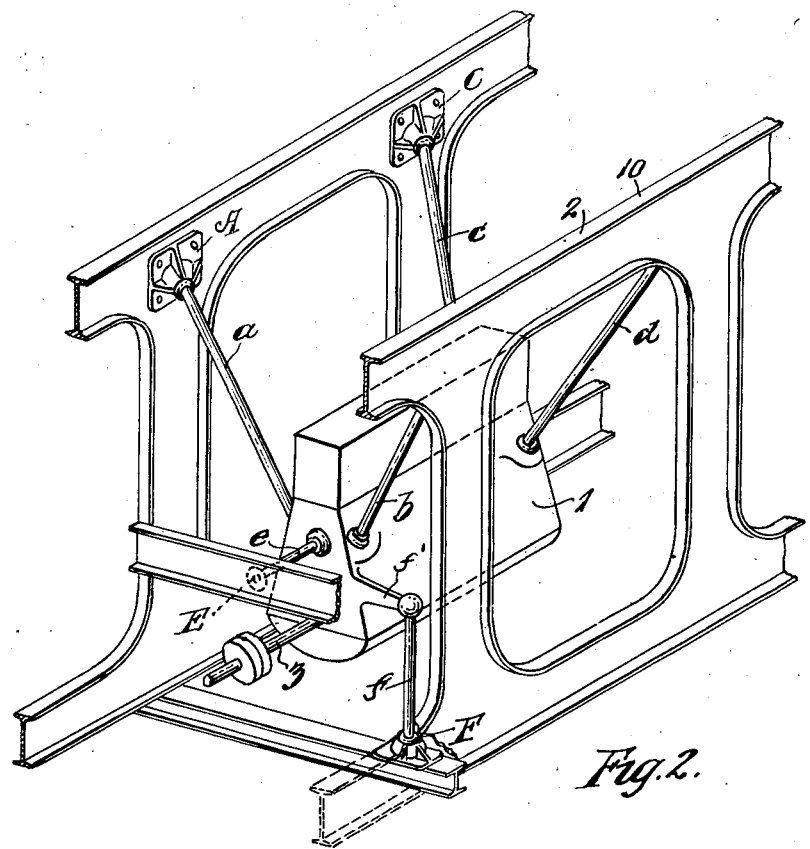
Figure 2 is a perspective view of the power engine as arranged within the chassis frame.

Referring now to Figures 1 and 2, it will be seen that the power engine 1 is suspended in the chassis 10 from points A, B, C, D, E, and F. Two suspension means $a$ and $b$ which connect the points A and B on the chassis with the engine 1 are adapted to support the engine in planes normal to the crank shaft 3 of the engine. The suspension means $c$ and $d$ which connect points C and D of the chassis with the engine are provided to prevent the rotation or torsion of the engine 1 in all planes of the crank shaft 3.

The suspension means e which connects point E on the chassis with the engine 1 is adapted to prevent the movement of the engine in the direction of the crank shaft 3, while a suspension rod f interconnects the point F of chassis 10 and the engine. An arm f' of the engine 1 is provided and interconnected with means f, to prevent rotation of the engine around crank shaft 3, as referred to above, said rotation being a result of the torque of the crank shaft. The suspension rods or means a, b, c, d, e, and f are connected with the chassis 10 by means of ball joints or Cardan joints, and the connections of the suspension rods with the housing of the engine 1 may be established in like manner.

It will therefore be seen that the engine 1 is rigidly connected to the chassis 10 by means of the six suspension rods or means above referred to, and any individual movement of the engine with respect to the chassis is thereby entirely eliminated.

Should the chassis be deformed during the operation of the vehicle, the connection points A, B, C, D, E, and F will be displaced, causing a displacement of the suspension means with regard to each other. As a result thereof the places on the engine housing or frame connected with these points by means of the suspension means are spatially displaced. The engine itself is therefore displaced in the space, but it is not possible for such displacement caused by the deformation of the chassis 10 to create the slightest tension within the engine housing or engine frame.

The suspension means may be provided with elastic elements as shown at 11 in Figure 4. Such elements may be shock absorbing members, and, if necessary, they may be of such a construction as to serve as noise reducing elements. These elements are interposed within the suspension means to prevent the transmission of shocks from the chassis or frame 10 to the engine, or to reduce noises created by the engine, which might otherwise be transferred to the chassis 10. If desirable, the suspension means a, b, c, d, e, and f may be made adjustable, as shown in Figure 4 at 12, to permit the adjustment of the power engine in any direction within the chassis. This adjustment feature is very desirable because it permits the re-location of the engine, after the chassis 10 has been considerably deformed, without the necessity of re-locating the connection points A, B, C, D, E, and F.

In view of the fact that the torque of the engine is resisted by the suspension means f, a measuring device 13 of any commercial construction may be cooperatively associated with said means to continuously measure the power of the engine during its operation. If the geometric dimensions of the mounting of the engine are considered in connection with such measuring instrumentality, then the latter will permit a determination of the torque of the engine, and if the revolutions of the engine are also measured at the same time, the power created by the engine may be accurately determined.

Figure 3:
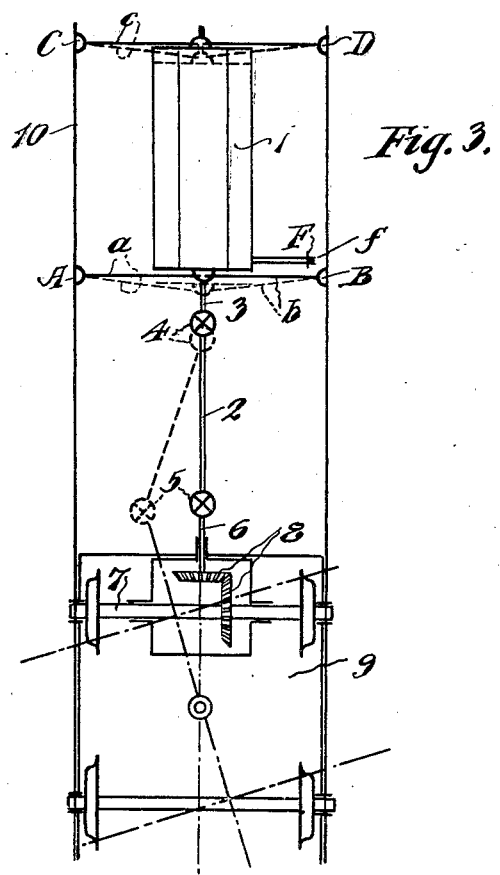
Figure 3 illustrates a modified arrangement of suspension of a power engine which is especially adaptable for vehicles which are provided with steerable wheel axles.

Figure 3 shows the suspension of the power engine in a manner similar to that illustrated in Figures 1 and 2. The engine 1 is suspended in this construction from the chassis 10 by means of the suspension means a, b, c, and d, which eliminate movement of the engine in a plane normal to the crank shaft 3, and which prevent the rotation in all planes of the crank shaft. The suspension means f resists the movement created by the torque of the crank shaft. The suspension rod e is eliminated in this modified construction, and an intermediate shaft 2 is used instead. Said shaft 2 is connected by means of universal joints 4 and 5 with the crank shaft 3 and drive shaft 6, which latter transmits rotation transferred to the same to the gears 8 and the wheel axle 7 mounted within the frame 9. The power engine may therefore follow the movements of the wheel axle. However, independent motion of the engine in the direction of the crank shaft 3 is not possible.

The modified suspension system as disclosed in Figure 3 is equal in efficiency to the suspension system illustrated in Figures 1 and 2, and therefore a deformation of the chassis will not cause exertion of tension to the engine or engine frame. The construction as disclosed in Figure 3 is especially adaptable for vehicle structures where the wheel axle is steerable and wherein therefore arrangements must be made to compensate for angular variations of the drive shaft.

Having thus described my invention, what I claim as new and desire to secure by Letters Patent of the United States, is—

1. In supporting means for motors or the like, a supporting frame, a motor supported thereby, a plurality of members connecting the motor to the frame for normally opposing relative movement of the motor with respect to the frame in all of its six degrees of freedom, each of said connecting members having flexible connection to the motor and frame and so constructed and arranged as to provide for distortion of the frame without transfer of strain to the motor through said connecting members.

2. A supporting means as claimed in claim 1 wherein the motor drive shaft constitutes one of the members.

3. A supporting means as claimed in claim 1 wherein the flexible connections comprise universal joints.

4. A supporting means as claimed in claim 1 wherein the flexible connections comprise universal joints and adjusting means for adjusting the position of the motor with respect to the frame.

5. In supporting means for motors or the like, a supporting frame, a plurality of link members connecting the motor to the frame at spaced points and extending in different directions, said link members having universal connections with the motor and frame and being constructed and arranged to oppose relative movement of the motor with relation to the frame in all of its degrees of freedom, whereby upon distortion of the frame each of said connecting links is free to adjust itself in all but one direction without communicating strain to the motor due to said distortion.

6. Supporting means of the class described comprising a supporting frame, a motor supported thereby in spaced relation thereto, a pair of connecting members flexibly connected to one end of the motor at spaced points and flexibly connected to the frame at spaced points thereon, a second pair of connecting members flexibly connected to the other end of the motor at spaced points and flexibly connected to the frame at points spaced from the other pair, another connecting member extending at an angle to the longitudinal axis of the motor and flexibly connected to the motor at one side of its said axis and also flexibly connected to the frame, and a further connecting member flexibly connected to the motor and frame and extending in a direction substantially parallel to the longitudinal axis aforesaid.

7. In a supporting means for motors or the like, a frame, a motor supported thereby having a longitudinal axis, a pair of link members universally connected to one end of the motor and diverging outwardly and universally connected to the frame at spaced points, a second pair of similarly disposed connecting members universally connected to the other end of the motor and diverging outwardly and connected universally to the frame at spaced points, another connecting member connected universally to the motor at one side of its longitudinal axis and disposed at substantially right angles to said motor axis and having a universal connection with the frame for opposing torsional rotation only of the motor about its axis, and a further connecting member having a universal connection to the frame and to the motor extending in a direction substantially parallel to said motor axis to resist axial movement of the motor with respect to the frame, the aforesaid connecting members normally opposing all degrees of freedom of the motor.

8. A supporting means as claimed in claim 7 in which each of said link members includes adjusting means whereby the length of the member may be changed.

9. A supporting means as claimed in claim 7 wherein the last-mentioned connecting member constitutes the motor drive shaft and is provided with a pair of universal joints between the motor and the frame connection.

CARL GEISSEN.